(12) United States Patent
Meng et al.

(10) Patent No.: US 8,229,481 B2
(45) Date of Patent: Jul. 24, 2012

(54) METHOD AND RELATED DEVICE FOR MAKING MEMORANDUM IN MOBILE COMMUNICATIONS DEVICE

(75) Inventors: Tzu-Yuan Meng, Taipei Hsien (TW); Wen-Hsin Chiang, Taipei Hsien (TW)

(73) Assignee: Winstron NeWeb Corporation, Hsi-Chih, Taipei Hsien (TW)

( * ) Notice: Subject to any disclaimer, the term of this patent is extended or adjusted under 35 U.S.C. 154(b) by 1223 days.

(21) Appl. No.: 11/843,656

(22) Filed: Aug. 23, 2007

(65) Prior Publication Data

US 2008/0305812 A1  Dec. 11, 2008

(30) Foreign Application Priority Data

Jun. 8, 2007 (TW) .............................. 96120815 A (51) Int. Cl.
*H04W 24/00* (2009.01)
(52) U.S. Cl. ..................... 455/466; 340/309.7; 340/457; 708/110
(58) Field of Classification Search ................... 455/466; 708/110; 340/309.7, 457
See application file for complete search history.

(56) References Cited

U.S. PATENT DOCUMENTS

| | | | |
|---|---|---|---|
| 7,085,590 B2 * | 8/2006 | Kennedy et al. | 455/556.1 |
| 7,293,275 B1 * | 11/2007 | Krieger et al. | 725/40 |
| 7,330,538 B2 * | 2/2008 | Dunsmuir | 379/88.18 |
| 7,333,976 B1 * | 2/2008 | Auerbach et al. | 1/1 |
| 2002/0078007 A1 * | 6/2002 | Herrero | 707/1 |
| 2005/0043948 A1 * | 2/2005 | Kashihara et al. | 704/242 |
| 2005/0079472 A1 * | 4/2005 | Shimamura et al. | 434/114 |
| 2005/0136953 A1 * | 6/2005 | Jo et al. | 455/466 |
| 2005/0286687 A1 * | 12/2005 | Sanmugasuntharam et al. | 379/88.19 |
| 2006/0047644 A1 * | 3/2006 | Bocking et al. | 707/4 |
| 2006/0129633 A1 * | 6/2006 | Potluri et al. | 709/203 |
| 2006/0291671 A1 * | 12/2006 | Hyatt | 381/110 |
| 2006/0293071 A1 * | 12/2006 | Skraba et al. | 455/466 |
| 2007/0101296 A1 * | 5/2007 | Won et al. | 715/841 |
| 2007/0156902 A1 * | 7/2007 | Becker | 709/226 |
| 2007/0270129 A1 * | 11/2007 | Luo | 455/414.1 |
| 2009/0117953 A1 * | 5/2009 | Oh | 455/575.1 |

FOREIGN PATENT DOCUMENTS

| | | |
|---|---|---|
| CN | 1414462 A | 4/2003 |
| CN | 1525301 A | 9/2004 |
| TW | 595792 | 6/2004 |
| TW | I266993 | 11/2006 |

* cited by examiner

*Primary Examiner* — Dwayne Bost
*Assistant Examiner* — Edward Zhang
(74) *Attorney, Agent, or Firm* — Winston Hsu; Scott Margo (57) ABSTRACT

A method for making a memorandum in a mobile communications device includes displaying a label on a screen of the mobile communications device, displaying a note in the label according to a first user instruction, and attaching a multimedia data corresponding to the note according to a second user instruction.

23 Claims, 7 Drawing Sheets

METHOD AND RELATED DEVICE FOR MAKING MEMORANDUM IN MOBILE COMMUNICATIONS DEVICE

BACKGROUND OF THE INVENTION

1. Field of the Invention

The present invention relates to a method and related device for making a memorandum in a mobile communications device, and more particularly, to a method and related device by attaching a multimedia data to a note for making the memorandum in the mobile communications device.

2. Description of the Prior Art

The general form of note stickers, such as the American company 3M's POST-IT, are wildly used in daily life. When a user wants to rapidly and briefly record important affairs or schedules, he or she can write down a note on a note sticker and paste the note sticker on various articles, such as file folders, desks or refrigerators, so that the user can be reminded of the relevant matters at any moment.

However, with the advance and the popularity of information technology, note stickers in electronic form have also emerged in personal computer systems. Similar to the conventional note stickers, the user can also record important affairs or schedules in an electronic note sticker, and can "paste" the electronic note sticker on a desktop of the computer system or in other folders, so as to remind the user of the relevant matters at any moment. In comparison to the conventional note stickers, the electronic note stickers are essentially computer application programs, and thus those skilled in the art can easily expand related functions according to practical demands. For example, the electronic note stickers can be edited or modified by the user at any moment, or can have a timer function for reminding the user in a predetermined time. Thus, for those accustomed to working with computers, the electronic note stickers have gradually replaced the conventional note stickers.

Figure 1:
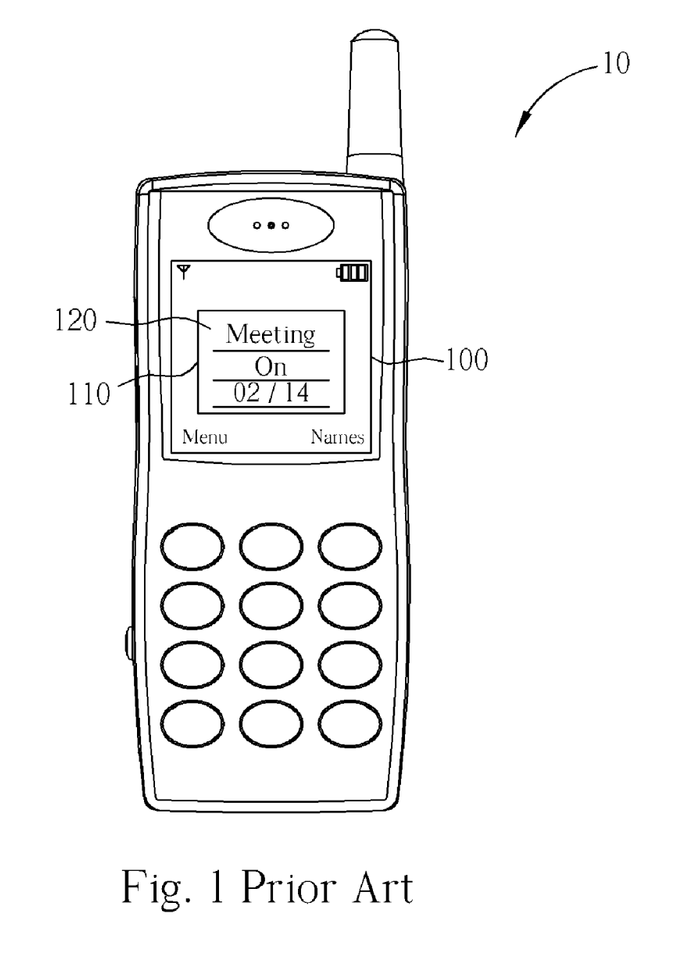
FIG. 1 is a schematic diagram of a prior art electronic note sticker applied on a mobile phone.

Similarly, the electronic note stickers can also be applied on mobile communications devices. However, since the mobile communications device has to be small in size and easy to carry, the screen cannot be designed too large in general. Thus, since confined by the screen size, the number of words and rows in each note of the electronic note sticker are greatly restricted. Please refer to FIG. 1. FIG. 1 is a schematic diagram of a prior art electronic note sticker applied on a mobile phone 10. As shown in FIG. 1, a screen 100 of the mobile phone 10 has 176×220 pixels, and thus, when an electronic note sticker 110 is displayed on the screen 100, each note 120 can only accommodate about three rows of words, so that the user can not fully record the related information appropriately, which significantly restricts applications of the electronic note stickers in the mobile communications devices.

SUMMARY OF THE INVENTION

It is therefore a primary objective of the present invention to provide a method and related device for making a memorandum in mobile communications device.

The present invention discloses a method for making a memorandum in a mobile communications device. The method comprises displaying a label on a screen of the mobile communications device; displaying a note in the label according to a first user instruction; and attaching a multimedia data corresponding to the note according to a second user instruction.

The present invention further discloses a method for making a memorandum in a mobile communications device, wherein a label is displayed on a screen of the mobile communications device and a note is displayed in the label. The method comprises providing a multimedia data; storing the multimedia data in the mobile communications device; and attaching the multimedia data corresponding to the note according to a multimedia data storage address.

The present invention further discloses a mobile communications device for making a memorandum. The mobile communications device comprises a screen; a keypad; a multimedia input unit for inputting multimedia signals; and a memorandum unit comprising an output module for displaying a label on the screen; a first input module for displaying a note in the label according to a first user instruction; and a second input module for attaching a multimedia data corresponding to the note according to a second user instruction.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
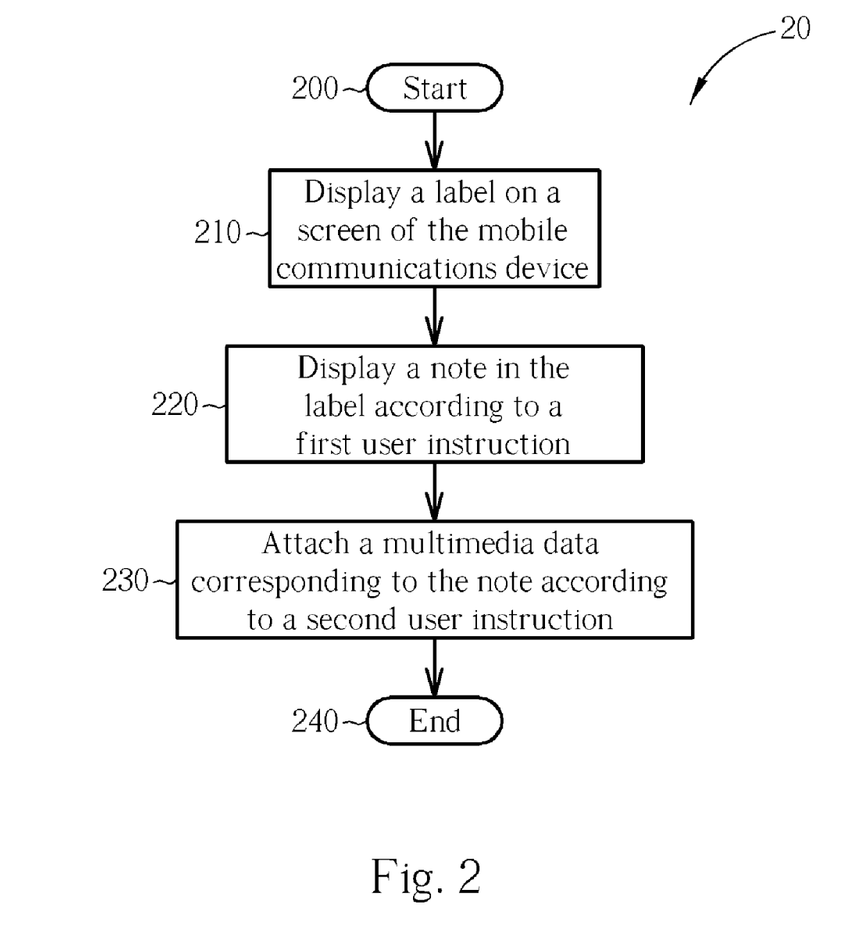
FIG. 2 is a schematic diagram of a process for making a memorandum in a mobile communications device according to an embodiment of the present invention.

Please refer to FIG. 2. FIG. 2 is a schematic diagram of a process 20 for making a memorandum in a mobile communications device according to an embodiment of the present invention. The process 20 includes the following steps:

Step 200: start.

Step 210: display a label on a screen of the mobile communications device.

Step 220: display a note in the label according to a first user instruction.

Step 230: attach a multimedia data corresponding to the note according to a second user instruction.

Step 240: end.

Therefore, according to the process 20, when the user makes a memorandum in the mobile communications device, the present invention can display the label on the screen of the mobile communications device. Meanwhile, the present invention can display the note corresponding to affairs being recorded in the label according to the first user instruction, and can attach the multimedia data corresponding to the note according to the second user instruction, among which the first user instruction and the second user instruction are signals inputted by the user through a character input unit and a multimedia input unit of the mobile communications devices, respectively corresponding to the note and the multimedia data. Preferably, the above-mentioned label can be an electronic note sticker, the multimedia data can be audio data or audio and video data, and the mobile communications device can be a mobile phone or a personal digital assistant (PDA). Therefore, with the process 20 of the present invention, the user not only can display the recorded affair through the note on the screen of the mobile communications device, but also can attach the multimedia data corresponding to the recorded affair to the label at the same time, so that the information of the affair can be recorded sufficiently.

Figure 3:
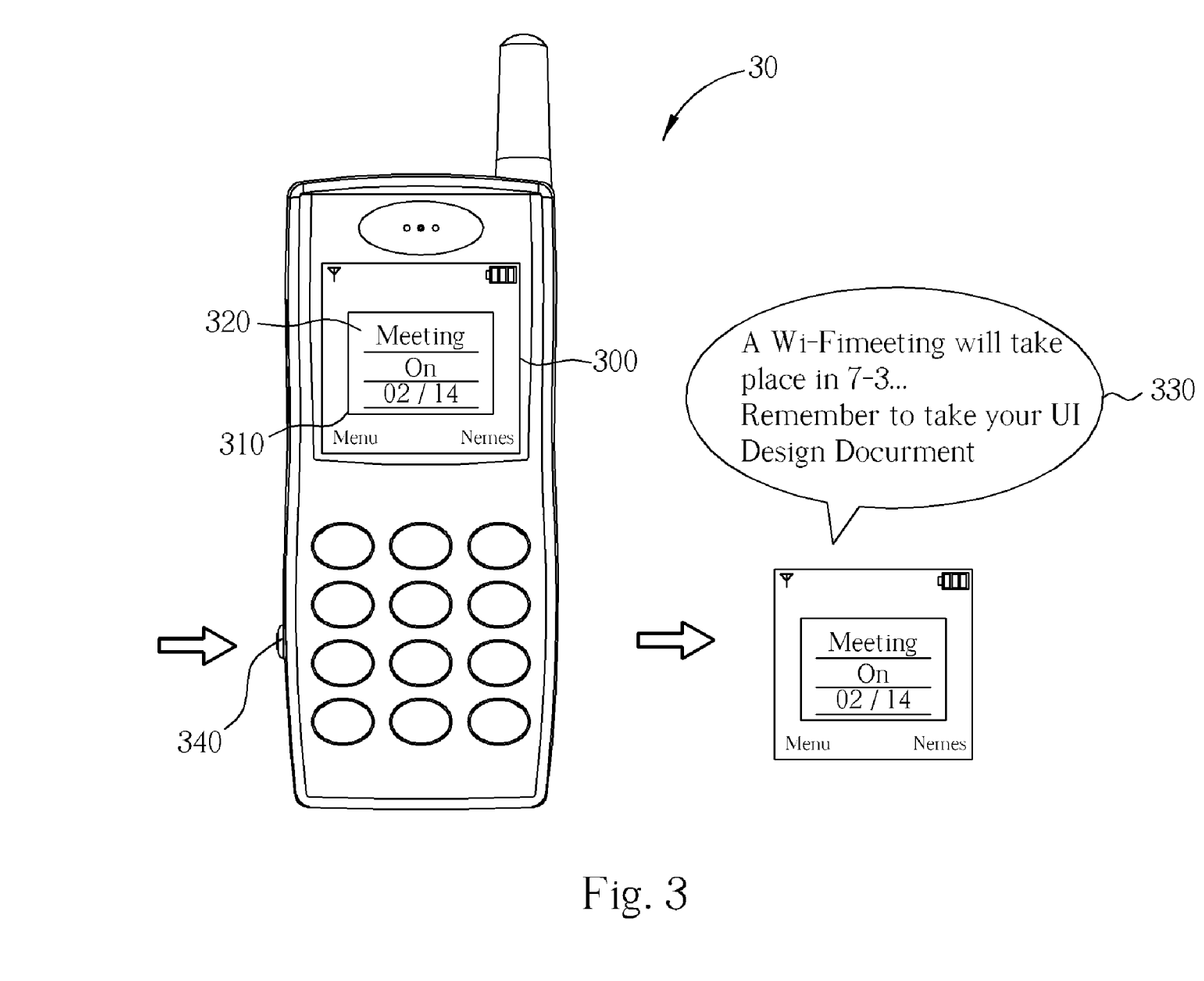
FIG. 3 is a schematic diagram of an application of the process in FIG. 2 according to an embodiment of the present invention.

For example, when the user wants to record an affair on a label, the present invention not only can briefly record the affair with a note, but can attach audio data corresponding to the note to the label for completely recording the affair with voices. Please refer to FIG. 3. FIG. 3 is a schematic diagram of an application of the process 20 according to an embodiment of the present invention. As shown in FIG. 3, a label 310 is displayed on a screen 300 of a mobile communications device 30. The label 310 is utilized for displaying a note 320, on which an affair can be recorded. Since confined by the size of the screen, only few words can be used for recording the affair in the note 320, and thus information of the affair cannot be recorded sufficiently for reminding the user. Therefore, by attaching audio data 330 corresponding to the note 320 to the label 310, the user can trigger a predetermined key 340 of the mobile communications device 30 for playing the audio data 330 to obtain sufficient information corresponding to the recorded affair, so that the condition that the user cannot sufficiently record the related information of the affair with the electronic note sticker in the mobile communications device can be improved.

Preferably, the label 310 of the present invention can be displayed on the screen 300 when the mobile communications device 30 is in an idle state, or in a predetermined time such as ten minutes before the schedule, for preventing the label 310 from influencing normal operations of the mobile communications device 30. In addition, the present invention can further have functions like editing and deleting the note 320, editing and deleting the audio data 330, or adding, selecting, deleting and moving the label 310, and those skilled in the art can certainly expand such similar functions according to practical demands, which are also in the range of the present invention.

On the other hand, the present invention can further transmit the label 310 to other electronic devices through a data transmission interface, such as infrared transmission interface, Bluetooth interface, or through multimedia message service (MMS) and Email. Thus, the label 310 of the present invention has to conform a specific data storage format, which includes a plurality of data fields for storing related data of the label 310. For example, please refer to FIG. 4.

Figure 4:
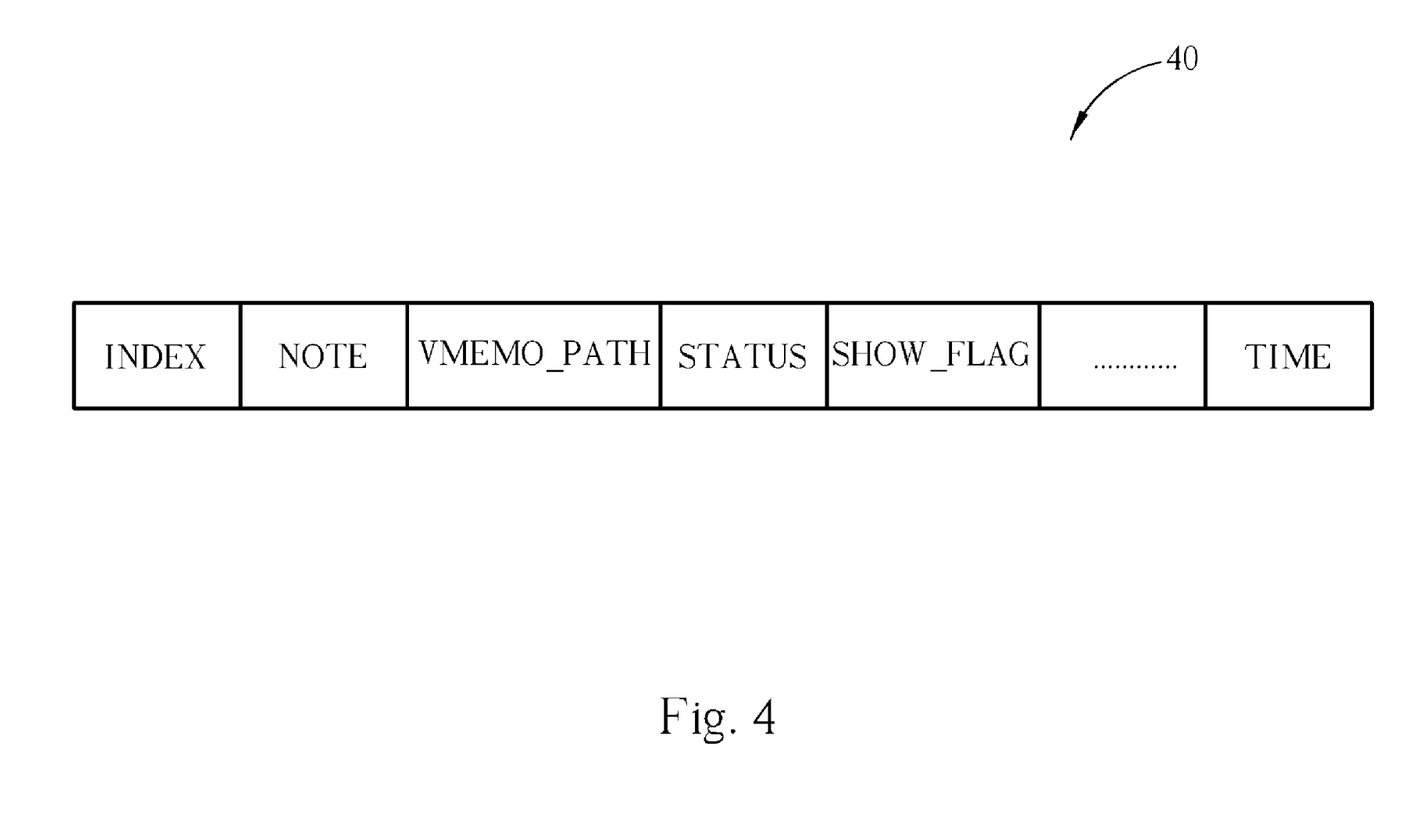
FIG. 4 is a schematic diagram of a data storage format of the label in FIG. 3 according to an embodiment of the present invention.

FIG. 4 is a schematic diagram of a data storage format 40 of the label 310 according to an embodiment of the present invention. The data storage format 40 includes an index field INDEX, a note content field NOTE, an audio data storage address field VMEMO_PATH, a storage status field STATUS, a label display status field SHOW_FLAG, a time field TIME, and so on. The index field INDEX is utilized for storing an index of the label 310. The note content field NOTE is utilized for storing contents of the note 320. The audio data storage address field VMEMO_PATH is utilized for storing a storage address of the audio data 330 corresponding to the note 320. The storage status field STATUS is utilized for indicating whether the audio data 330 corresponding to the note 320 is in a play state. The label display status field SHOW_FLAG is utilized for indicating whether the label 310 is displayed on the screen 300 of the mobile communications device. The time field TIME is utilized for storing a time when generating the label 310. Note that, those skilled in the art can add other desired data fields in the data storage format 40 according to practical demands, such as a multimedia data content field for storing the content of the multimedia data, and are not limited thereto. Therefore, after generating the label 310 in the mobile communications device 30, the user can transmit the label 310 to other electronic devices such as mobile phones or computers through the above-mentioned data transmission manners, so that the other user can obtain the information of the recorded affair as well.

Figure 5:
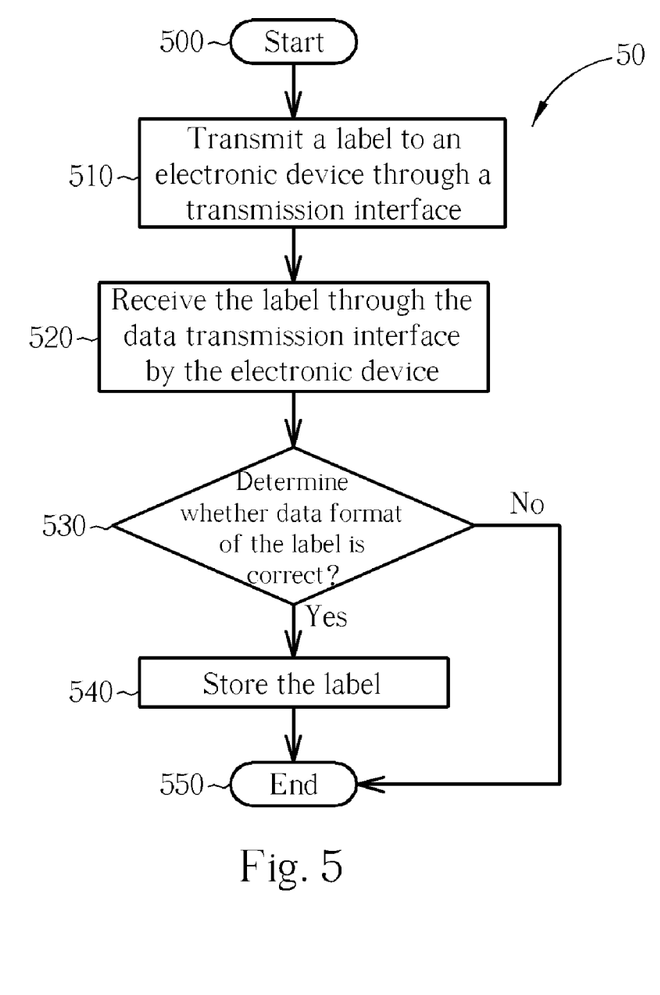
FIG. 5 is a schematic diagram of a data transmission process for transmitting a label to another electronic device through a data transmission interface according to an embodiment of the present invention.

Please further refer to FIG. 5. FIG. 5 is a schematic diagram of a data transmission process 50 for transmitting a label to another electronic device through a data transmission interface according to an embodiment of the present invention. The data transmission process 50 includes the following steps:

Step 500: start.

Step 510: transmit a label to an electronic device through a transmission interface.

Step 520: receive the label through the data transmission interface by the electronic device.

Step 530: determine whether data format of the label is correct. If so, proceed to Step 540; and if not, proceed to Step 550.

Step 540: store the label.

Step 550: end.

Figure 7:
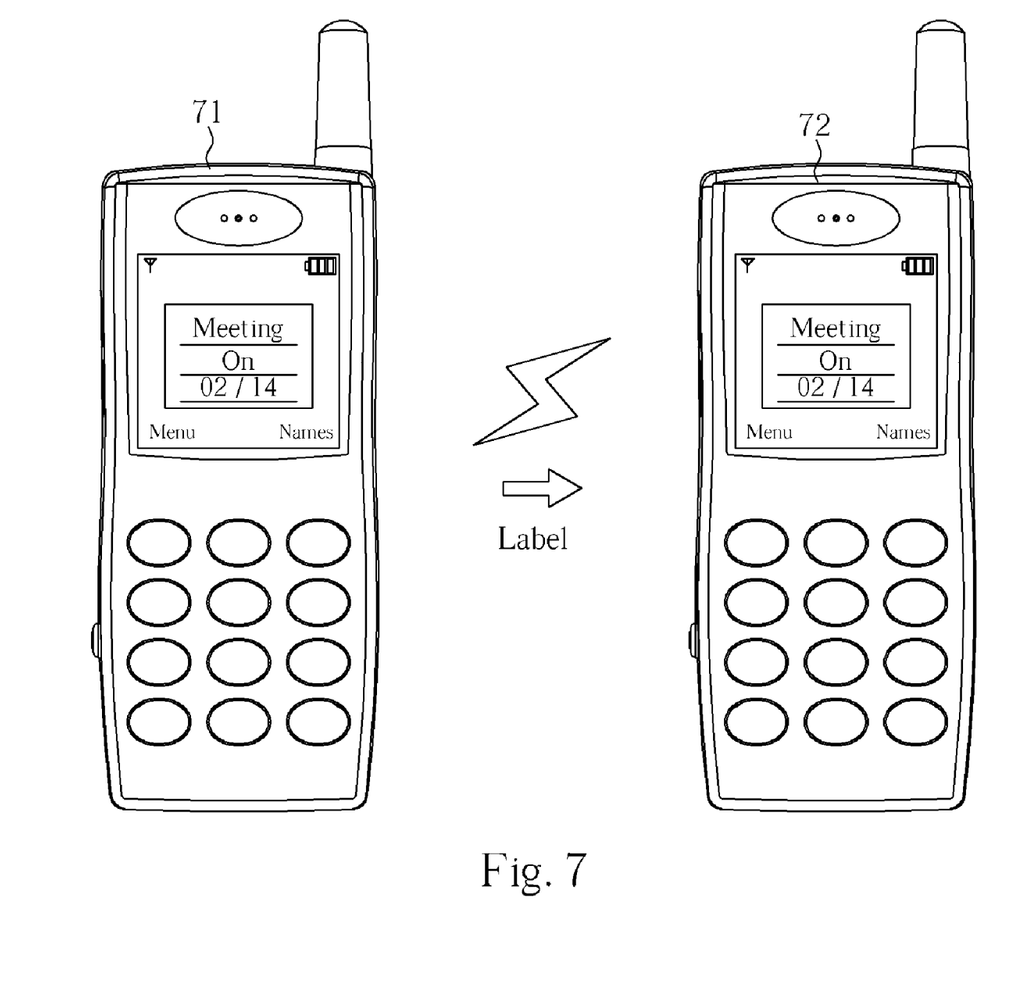
FIG. 7 is a schematic diagram of an exemplary implementation of the data transmission process in FIG. 5 according to an embodiment of the present invention.

Therefore, according to the data transmission process 50, the present invention firstly transmits the label from the mobile communications device to the electronic device through the data transmission interface. When the label is received by the electronic device through the data transmission interface, the electronic device then determines whether the data format of the label conforms to the data storage format 40 mentioned above. If the data format is correct, the electronic device stores the label and displays the label on the screen at the appropriate time; and if not, the electronic device discards the received data. Therefore, in the present invention, the other user can also obtain the information corresponding to the recorded affair by reading the label and playing the corresponding audio data. An exemplary implementation of the data transmission process 50 is shown in FIG. 7.

Figure 6:
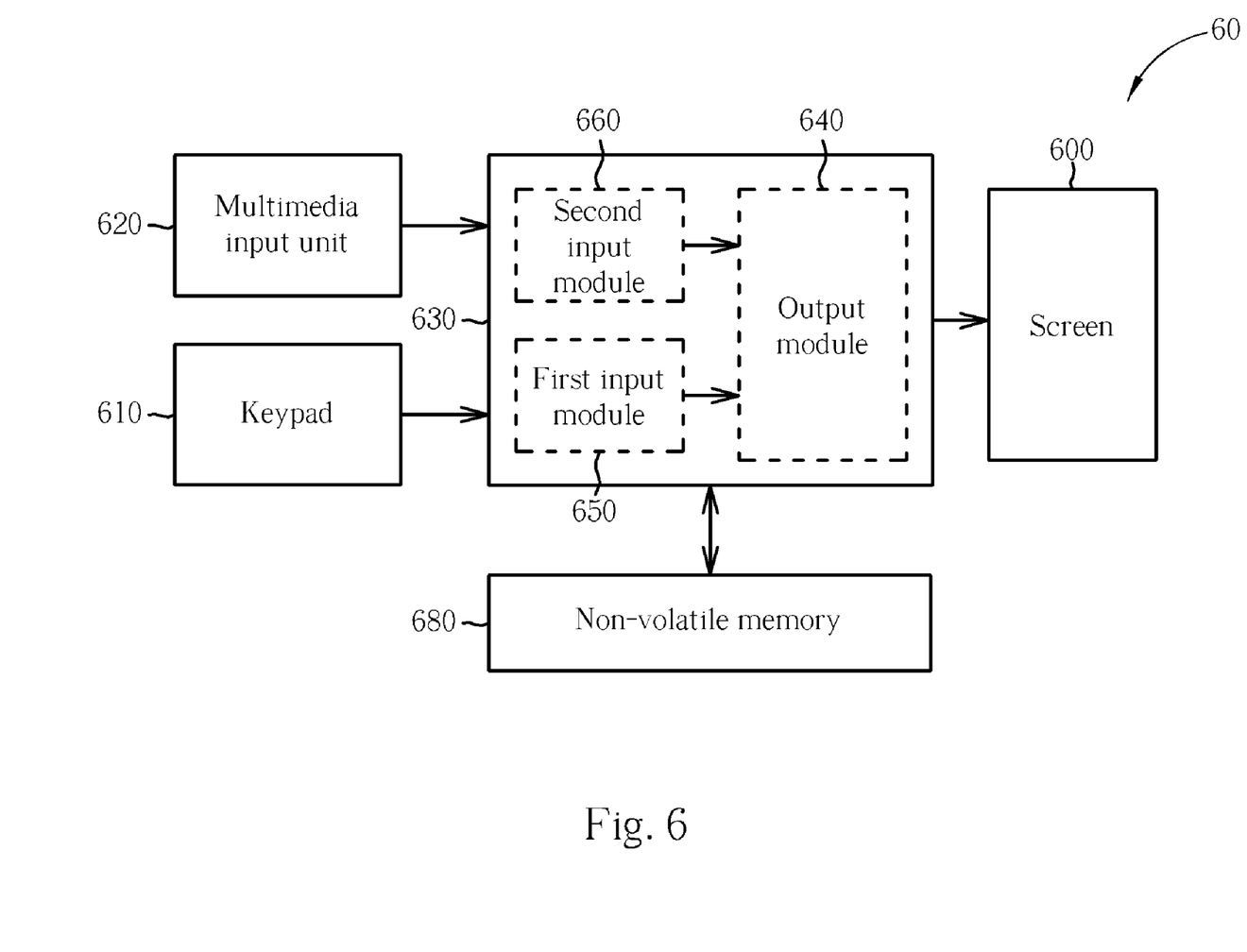
FIG. 6 is a functional block diagram of a mobile communications device for making a memorandum according to an embodiment of the present invention.

Please refer to FIG. 6. FIG. 6 is a functional block diagram of a mobile communications device 60 for making a memorandum according to an embodiment of the present invention. The mobile communications device 60 is utilized for realizing the process 20, and includes a screen 600, a keypad 610, a multimedia input unit 620 and a memorandum unit 630. The multimedia input unit 620 is utilized for inputting multimedia signals, which can be a microphone or an audio and video input device. The memorandum unit 630 includes an output module 640, a first input module 650 and a second input module 660. The output module 640 is utilized for displaying a label on the screen 600. The first input module 650 is utilized for displaying a note in the label according to a first user instruction. The second input module 660 is utilized for attaching a multimedia data corresponding to the note according to a second user instruction. Note that, the first input module 650 can be a keypad control module, the second input module 660 can be a multimedia data coder/decoder module, and the output module 640 can be a data processing module.

Certainly, those skilled in the art can implement the modules with different hardware or with firmware, and are not limited thereto. Moreover, the mobile communications device 60 can further include a non-volatile memory 680 for storing related data of the label. Therefore, with the mobile communications device 60, the user not only can display the recorded affair through a note on the screen 600, but also can attach the multimedia data corresponding to the recorded affair to the note at the same time, so that the information of the affair can be recorded sufficiently.

As mentioned above, by attaching audio data to a note, the present invention can solve the problem that the number of words is greatly confined due to the screen size of the mobile communications device, so as to increase convenience for the user. In addition, the present invention can further transmit the label to other electronic devices through the data transmission interface, with a result that the other user can obtain the information of the recorded affair as well.

Those skilled in the art will readily observe that numerous modifications and alterations of the device and method may be made while retaining the teachings of the invention.

What is claimed is:

1. A method for making a memorandum in a mobile communications device comprising:
    displaying a label on a screen of the mobile communications device;
    displaying a note in the label according to a first user instruction; and
    attaching an audio data corresponding to the note to the label according to a second user instruction; and
    playing the audio data when the label is displayed on the mobile communications device and the mobile communications device determines that the number of words of the note is larger than the screen size of the mobile communications device.

2. The method of claim 1, wherein displaying the note in the label further comprises editing the note.

3. The method of claim 1, wherein attaching the audio data corresponding to the note further comprises editing the audio data.

4. The method of claim 1, wherein displaying the label having the note is displaying the label on the screen of the mobile communications device when the mobile communications device is in an idle state.

5. The method of claim 1, wherein displaying the label having the note is displaying the label on the screen of the mobile communications device in a predetermined time.

6. The method of claim 1, wherein the label conforms to a data storage format, the data storage format comprises:
    a note content field for storing contents of the note; and
    a multimedia data storage address field for storing a storage address of the audio data corresponding to the note.

7. The method of claim 6, wherein the data storage format further comprises:
    a index field for storing an index of the label;
    a storage status field for indicating whether the audio data corresponding to the note is in a play state;
    a label display status field for indicating whether the label is displayed on the screen of the mobile communications device; and
    a time field for storing a time when generating the label.

8. The method of claim 1 further comprising: transmitting the label to an electronic device through a transmission interface.

9. A method for making a memorandum in a mobile communications device, wherein a label is displayed on a screen of the mobile communications device and a note is displayed in the label, the method comprising:
    providing an audio data;
    storing the audio data in the mobile communications device; and
    attaching the audio data corresponding to the note to the label according to a multimedia data storage address; and
    playing the audio data when the label is displayed on the mobile communications device and the mobile communications device determines that the number of words of the note is larger than the screen size of the mobile communications device.

10. The method of claim 9 further comprising:
    triggering a predetermined key for playing the audio data when the mobile communications device displays the note in the label.

11. The method of claim 9 further comprising: transmitting the label to an electronic device through a transmission interface.

12. The method of claim 9, wherein the label conforms to a data storage format, the data storage format comprises:
    a note content field for storing contents of the note; and
    a multimedia data storage address field for storing the multimedia data storage address of the audio data corresponding to the note.

13. The method of claim 12, wherein the data storage format further comprises:
    a index field for storing an index of the label;
    a storage status field for indicating whether the audio data corresponding to the note is in a play state;
    a label display status field for indicating whether the label is displayed on the screen of the mobile communications device; and
    a time field for storing a time when generating the label.

14. A mobile communications device for making a memorandum comprising:
    a screen;
    a keypad;
    a multimedia input unit for inputting multimedia signals; and
    a memorandum unit comprising:
    an output module for displaying a label on the screen and playing an audio data after being triggered and the label is displayed on the mobile communications device;
    a first input module for displaying a note in the label according to a first user instruction; and
    a second input module for attaching the audio data corresponding to the note according to a second user instruction when the mobile communications device determines that the, number of words of the note is larger than the screen size of the mobile communications device.

15. The mobile communications device of claim 14, wherein the output module is further utilized for playing the audio data when a predetermined key of the mobile communications device is triggered.

16. The mobile communications device of claim 14, wherein the first input module is further utilized for editing and deleting the note.

17. The mobile communications device of claim 14, wherein the second input module is further utilized for editing and deleting the audio data.

18. The mobile communications device of claim 14, wherein the output module is further utilized for deleting the label.

19. The mobile communications device of claim 14, wherein the label can be transmitted to an electronic device through a transmission interface.

20. The mobile communications device of claim 14, wherein the output module for displaying the label on the screen of the mobile communications device is for displaying the label on the screen of the mobile communications device when the mobile communications device is in an idle state.

21. The mobile communications device of claim 14, wherein the output module for displaying the label on the screen of the mobile communications device is for displaying the label on the screen of the mobile communications device in a predetermined time.

22. The mobile communications device of claim 14, wherein the label conforms to a data storage format, the data storage format comprises:

a note content field for storing contents of the note; and a multimedia data storage address field for storing a storage address of the audio data corresponding to the note.

23. The mobile communications device of claim 22, wherein the data storage format further comprises:

a index field for storing an index of the label;

a storage status field for indicating whether the audio data corresponding to the note is in a play state;

a label display status field for indicating whether the label is displayed on the screen of the mobile communications device; and a time field for storing a time when generating the label.

* * * * *

UNITED STATES PATENT AND TRADEMARK OFFICE
CERTIFICATE OF CORRECTION

| | | |
|---|---|---|
| PATENT NO. | : 8,229,481 B2 | Page 1 of 1 |
| APPLICATION NO. | : 11/843656 | |
| DATED | : July 24, 2012 | |
| INVENTOR(S) | : Tzu-Yuan Meng et al. | |

It is certified that error appears in the above-identified patent and that said Letters Patent is hereby corrected as shown below:

On the title page, item (73), correct the name of the assignee from "Winstron NeWeb Corporation" to --Wistron NeWeb Corporation--.

Signed and Sealed this
Sixteenth Day of October, 2012

David J. Kappos
*Director of the United States Patent and Trademark Office*